US007594484B2

(12) United States Patent
Lavender et al.

(10) Patent No.: US 7,594,484 B2
(45) Date of Patent: Sep. 29, 2009

(54) BLOWER HOUSING FOR INTERNAL COMBUSTION ENGINE

(75) Inventors: Stephen John Lavender, Racine, WI (US); Randall J. Klotka, Grafton, WI (US); Kenneth William Derra, New Berlin, WI (US); Michael John Derra, Pewaukee, WI (US); Rick Harold Lulloff, Oshkosh, WI (US)

(73) Assignee: Briggs and Stratton Corporation, Wauwatosa, WI (US)

( * ) Notice: Subject to any disclaimer, the term of this patent is extended or adjusted under 35 U.S.C. 154(b) by 457 days.

(21) Appl. No.: 11/339,099

(22) Filed: Jan. 25, 2006

(65) Prior Publication Data

US 2006/0169256 A1 Aug. 3, 2006

Related U.S. Application Data

(60) Provisional application No. 60/649,155, filed on Feb. 2, 2005.

(51) Int. Cl.
*F01P 1/02* (2006.01)
*F01P 7/04* (2006.01)
*F01P 1/00* (2006.01)
*B01D 45/00* (2006.01)

(52) U.S. Cl. ................ 123/41.7; 123/41.56; 123/41.65; 123/198 E; 55/434

(58) Field of Classification Search .............. 123/41.56, 123/41.63, 41.65, 195 C, 184.21, 198 E, 123/41.7; 55/398, 394, 392, 434
See application file for complete search history.

(56) References Cited

U.S. PATENT DOCUMENTS 470,403 A 3/1892 Robinson
1,922,299 A * 8/1933 Juengling et al. ............. 55/398
2,203,188 A 6/1940 Beer
2,894,599 A 7/1959 Leininger
3,371,471 A 3/1968 Connors
3,530,649 A 9/1970 Porsch et al.
4,204,486 A * 5/1980 Nakagawa et al. ......... 123/41.6
4,261,302 A * 4/1981 Sheldon ...................... 123/41.7
4,537,160 A * 8/1985 Shirai ....................... 123/41.58
4,708,723 A 11/1987 Howeth (Continued)

FOREIGN PATENT DOCUMENTS

EP 1 389 681 2/2004

*Primary Examiner*—Stephen K Cronin
*Assistant Examiner*—Sizo B Vilakazi
(74) *Attorney, Agent, or Firm*—Michael Best & Friedrich LLP

(57) ABSTRACT

A blower housing for use with an engine. The blower housing is adapted to receive a stream of intake air, and the engine includes at least one cylinder. The blower housing includes an intake opening, an air filter housed within a filter compartment, and an air flow duct adjacent to the filter compartment. The air flow duct is configured to direct air to the at least one cylinder. The air flow duct includes a first surface and a second surface, the first surface being angled with respect to the second surface to deflect the air passing through the duct away from the first surface toward the second surface. The first surface separates the air into a first portion and a second portion having deflected particulate matter therein. The duct also has an aperture that allows air to flow from the duct to the air filter, and an exhaust window.

28 Claims, 8 Drawing Sheets

U.S. PATENT DOCUMENTS

| | | | | | |
|---|---|---|---|---|---|
| 4,831,685 | A | | 5/1989 | Bosyj et al. | |
| 4,946,482 | A | * | 8/1990 | Tamba et al. | 55/320 |
| 5,343,831 | A | * | 9/1994 | Collins | 123/41.65 |
| 5,363,815 | A | * | 11/1994 | Pretzsch et al. | 123/41.7 |
| 5,526,777 | A | * | 6/1996 | Taomo et al. | 123/41.65 |
| 5,542,380 | A | * | 8/1996 | Chatten | 123/41.7 |
| 5,632,243 | A | | 5/1997 | Buchholz et al. | |
| 5,746,160 | A | | 5/1998 | Stark et al. | |
| 6,048,376 | A | | 4/2000 | Miller | |
| 6,295,953 | B1 | | 10/2001 | Ohsawa et al. | |
| 6,491,734 | B1 | * | 12/2002 | Park | 55/385.3 |
| 6,681,726 | B2 | * | 1/2004 | Linsbauer et al. | 123/41.65 |
| 6,797,024 | B2 | | 9/2004 | Inoue | |
| 6,948,457 | B2 | * | 9/2005 | Maier et al. | 123/41.65 |
| 7,147,684 | B2 | * | 12/2006 | Anderson et al. | 55/385.1 |
| 7,296,395 | B1 | * | 11/2007 | Hartman et al. | 60/39.092 |
| 2002/0189560 | A1 | | 12/2002 | Linsbauer et al. | |
| 2003/0182910 | A1 | | 10/2003 | Pikesh et al. | |
| 2003/0221640 | A1 | | 12/2003 | Ohsawa | |

* cited by examiner

BLOWER HOUSING FOR INTERNAL COMBUSTION ENGINE

RELATED APPLICATIONS

This application claims priority to U.S. Provisional Patent Application No. 60/649,155, filed Feb. 2, 2005, the entire contents of which is incorporated by reference herein.

FIELD OF THE INVENTION

The invention relates to internal combustion engines, and more particularly to a blower housing for an internal combustion engine.

BACKGROUND OF THE INVENTION

Many internal combustion engines are provided with fans or blowers that force cooling air over certain engine surfaces during engine operation. Air-cooled engines typically include engine cylinders and cylinder heads that incorporate heat sinks in the form of cooling fins. In this regard, fans and blowers are often provided to force air over the cooling fins, thereby cooling the engine. To further enhance the circulation of cooling air, and to thereby improve the engine cooling process, many engines include special housings and/or ductwork that guide the cooling air to different areas of the engine that require cooling.

The fans also can provide air to the engine for use in the combustion reaction in the cylinders. Air is drawn through a filter to remove debris from the air stream before the air enters the combustion chamber. For engines operating in environments having significant amounts of airborne dust and particulate debris, screens and the like are often provided in an attempt to reduce the amount of dirt and debris that enters the housings and ductwork. However, even with a screen in place, dirt and debris still enter the blower housing. It is desirable to further reduce the amount of dirt and debris in the air that is drawn through the filter to extend the life of the filter.

SUMMARY OF THE INVENTION

The present invention provides a blower housing for use with an engine. The blower housing is adapted to receive intake air, and includes an intake opening through which air flows into the blower housing, an air filter housed within a filter compartment, and an air flow duct adjacent to the filter compartment. The air flow duct is configured to direct air that will be used by at least one cylinder of the engine for combustion. The air flow duct has a first surface and a second surface. The first surface is angled with respect to the second surface to deflect the air passing through the duct away from the first surface toward the second surface. The first surface separates the air into a first portion and a second portion having deflected particulate matter therein. The air flow duct further includes an aperture that allows air to flow from the air flow duct to the air filter, the first portion of the air traveling through the aperture to the air filter. The duct also defines an exhaust window, the second portion of the air exiting the blower housing through the exhaust window.

In one embodiment, the blower housing further comprises a sidewall, and wherein the first surface and the sidewall define the aperture through which air passes to the air filter. In another embodiment, the sidewall is positioned normal to the first surface such that the first portion of the air turns sharply from a direction substantially parallel to the first surface to a direction substantially parallel to the sidewall to pass over the sidewall and into the filter. In another embodiment, the cross-sectional area of the exhaust window is sized to minimize backflow of air from the outside environment. In yet another embodiment, the duct includes an upstream end and a downstream end, and wherein the cross-sectional area of the duct is larger at the upstream end than at the downstream end. In another embodiment, the first surface includes a ramped portion that is positioned vertically above the second surface such that particulate matter in the air stream that strikes the ramped portion falls downwardly toward the second surface.

The invention also provides an engine having at least one cylinder, an air/fuel mixing device, a fan rotatable about an axis to draw a stream of air into the engine, and a blower housing. The blower housing includes an intake opening positioned radially outwardly from the fan, an air filter housed within a filter compartment, and at least one air flow duct. The air flow duct includes an exhaust window through which air exits the blower housing, and a first surface. The first surface has a ramped portion that deflects the air passing through the air flow duct. The ramped portion separates the air into a first portion that has a first amount of particulate matter, and a second portion having a second amount of particulate matter that is different than the first amount.

Other features of the invention will become apparent to those skilled in the art upon review of the following detailed description, and drawings.

Figure 1:
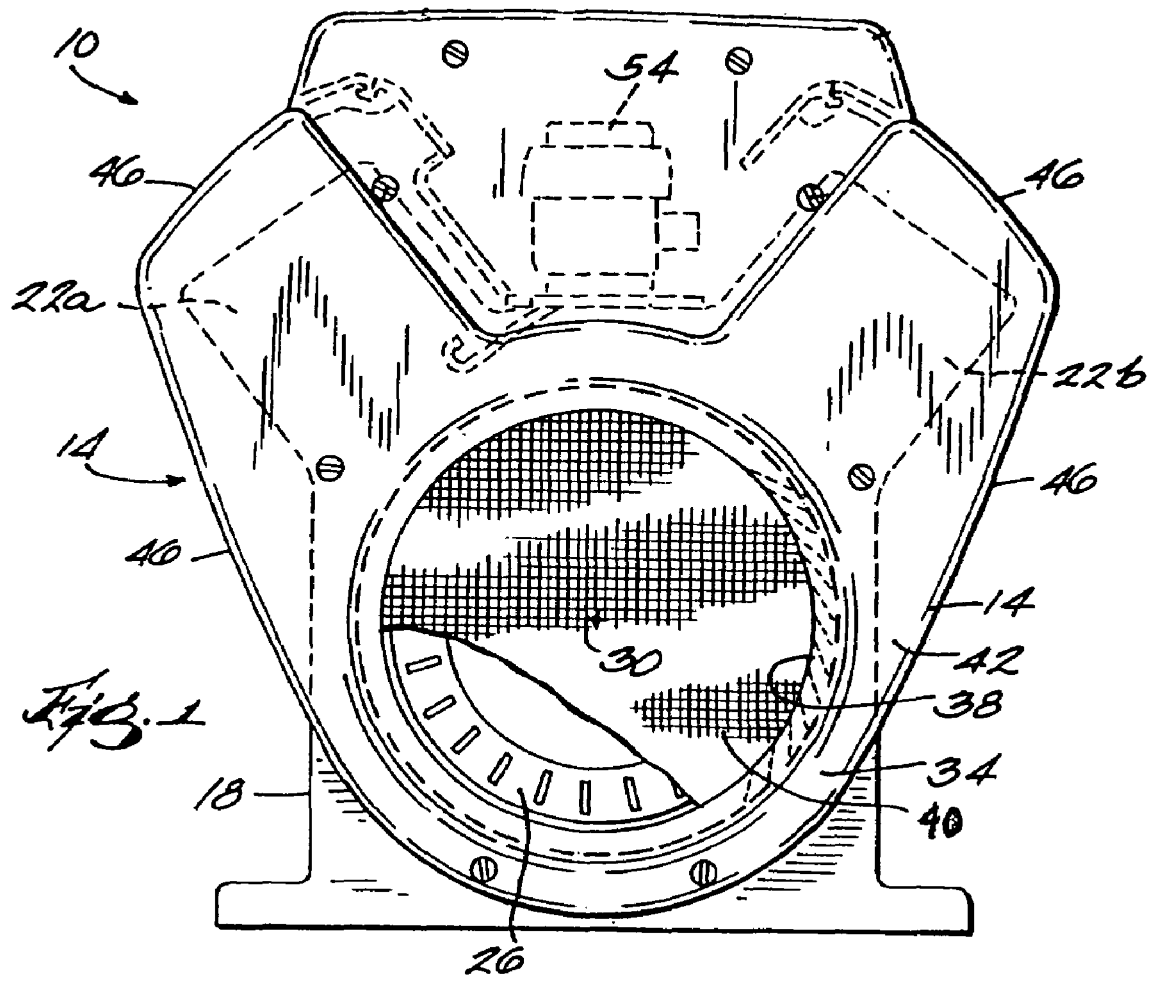
FIG. 1 is a schematic view of an internal combustion engine including a blower housing embodying the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including," "having," and "comprising" and variations thereof herein is meant to encompass the items listed thereafter and equivalents thereof as well as additional items.

DETAILED DESCRIPTION

The figures illustrate an internal combustion engine 10 and blower housing 14 embodying the present invention. The engine 10, as illustrated schematically in FIG. 1, includes an engine block 18 that rotatably supports a crankshaft (not shown) and first and second engine cylinder assemblies 22*a*, 22*b* that each include an engine cylinder and engine cylinder head, as is known in the art. The cylinder head may be integrally formed with the cylinder, or the cylinder head and cylinder may be separate components. The cylinder assemblies 22*a*, 22*b* extend from the engine block 18 at an angle with respect to one another. In this regard the illustrated engine 10 is a V-twin engine, however the blower housing 14 can be adapted for use with other types of engines having other cylinder configurations including, without limitation, single-cylinder engines and multi-cylinder engines of inline, opposed, radial and V configurations, for example. In addition, the blower housing 14 can be utilized with engines having horizontal or vertical crankshafts, or with engines that can be operated in a variety of operating orientations.

The engine 10 also includes a fan 26 that is supported for rotation about an axis 30. In some embodiments, the fan 26 is coupled to an end of the crankshaft that extends from the engine block 18, however other fan configurations are possible as well. The fan 26 is rotatable about the axis 30 to enhance the flow of air over various engine surfaces to cool the engine 10, as is known in the art, and to provide combustion air to the engine 10.

The blower housing 14 is coupled to the engine 10 and includes a first housing portion 34 that substantially overlies a portion of the engine block 18 and defines an intake opening 38. The intake opening 38 is in fluid communication with the fan 26 and, in the illustrated embodiment, the intake opening 38 generally surrounds the fan 26 and is substantially concentric with the axis 30. A fan screen 40 is coupled to the fan 26 to reduce the entry of air-borne dirt and debris into the blower housing 14. It is understood that in some embodiments, the fan screen 40 is a stationary screen that is coupled directly to the blower housing 14 and may not rotate with the fan 26.

The first housing portion 34 includes a front wall 42 that is substantially normal to the axis 30, spaced from the engine block 18, and defines the intake opening 38. The first housing portion 34 also includes sidewalls 46 that extend away from the front wall 42 toward the engine block 18. In some embodiments, the sidewalls 46 are coupled directly to the engine block 18. In other embodiments, additional walls, bosses, extensions and the like can be provided to couple the first housing portion 34 to the engine. The sidewalls 46 include both arcuate and planar sections, and extend generally parallel to the axis 30. Of course the specific configuration of the sidewalls 46 depends at least in part upon the configuration of the engine 10 to which the blower housing 14 is coupled. The front wall 42 and the sidewalls 46 cooperate with the engine block 18 to at least partially define an air flow chamber through which cooling air can flow.

Figure 2:
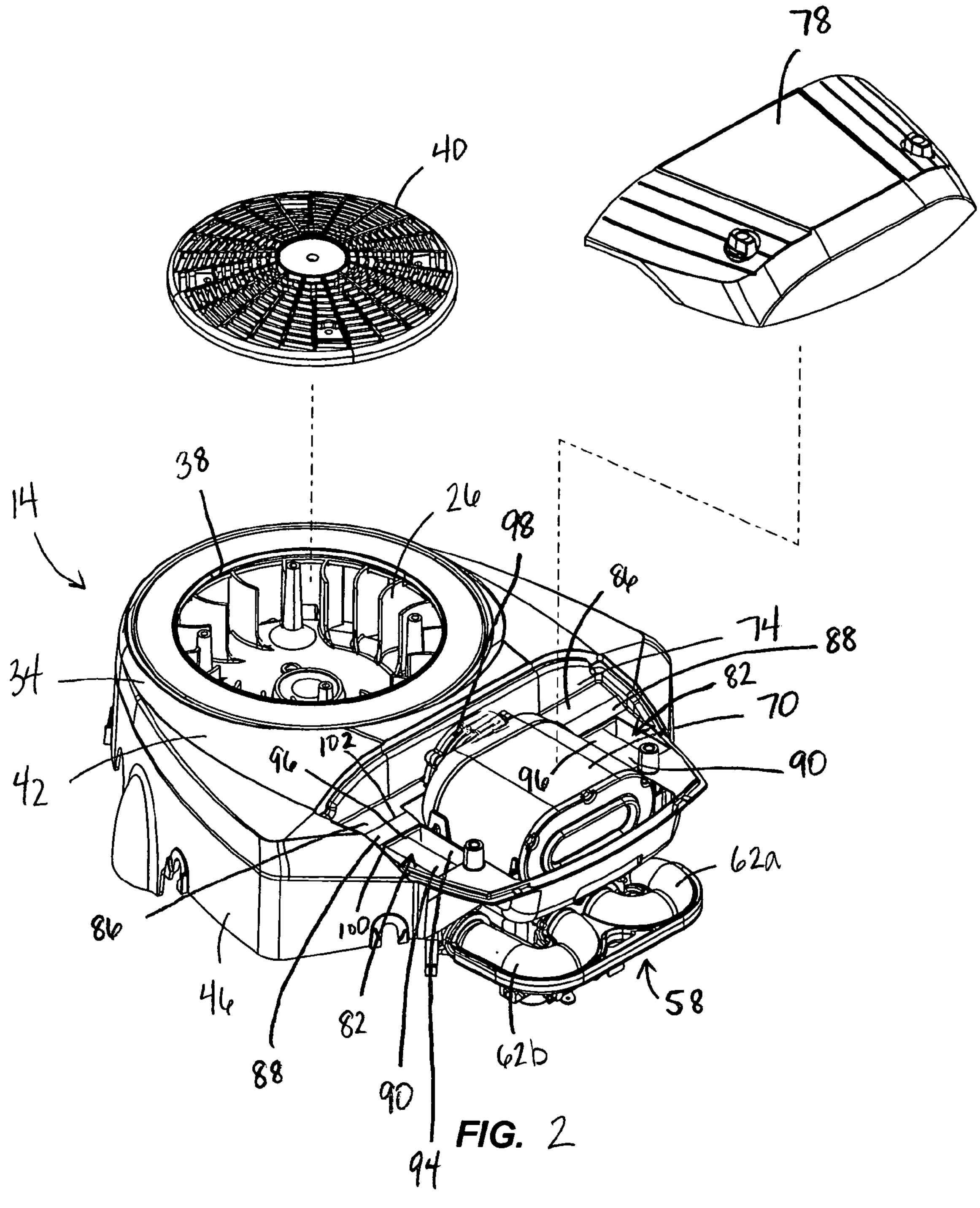
FIG. 2 is an exploded perspective view of the blower housing illustrated in FIG. 1.
Figure 3:
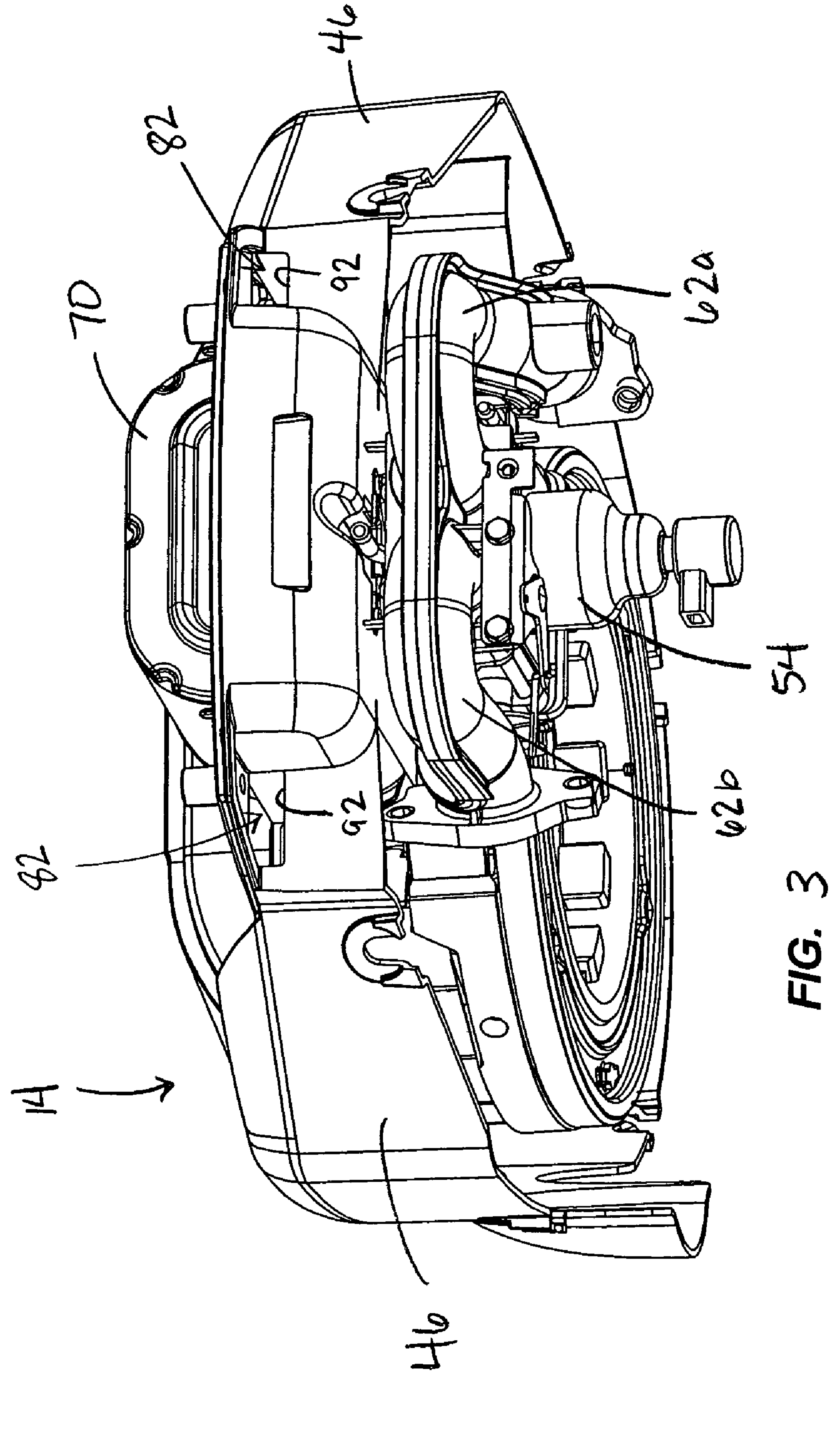
FIG. 3 is a perspective view of the blower housing illustrated in FIG. 1.
Figure 4:
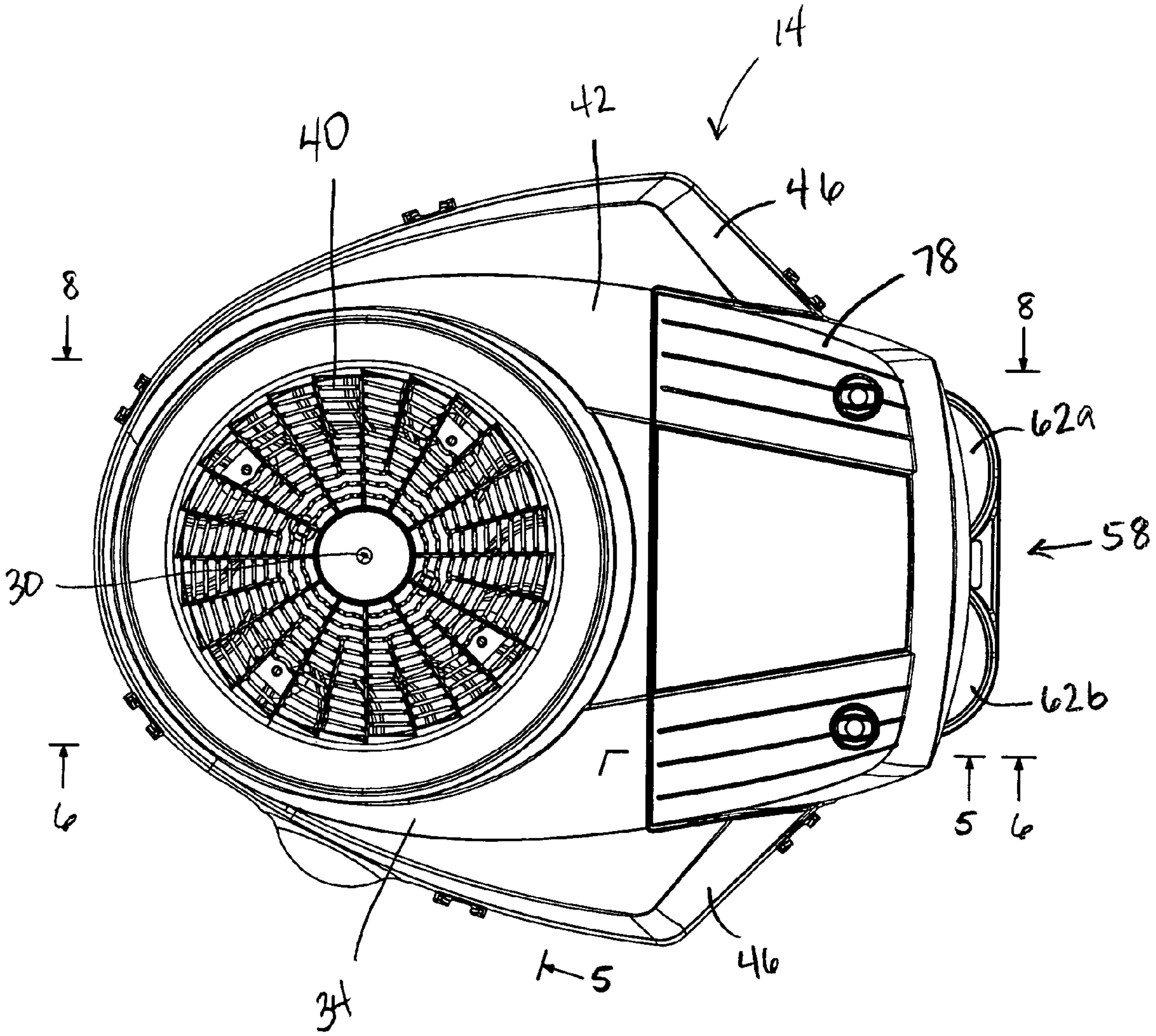
FIG. 4 is a top view of the blower housing illustrated in FIG. 1.
Figure 5:
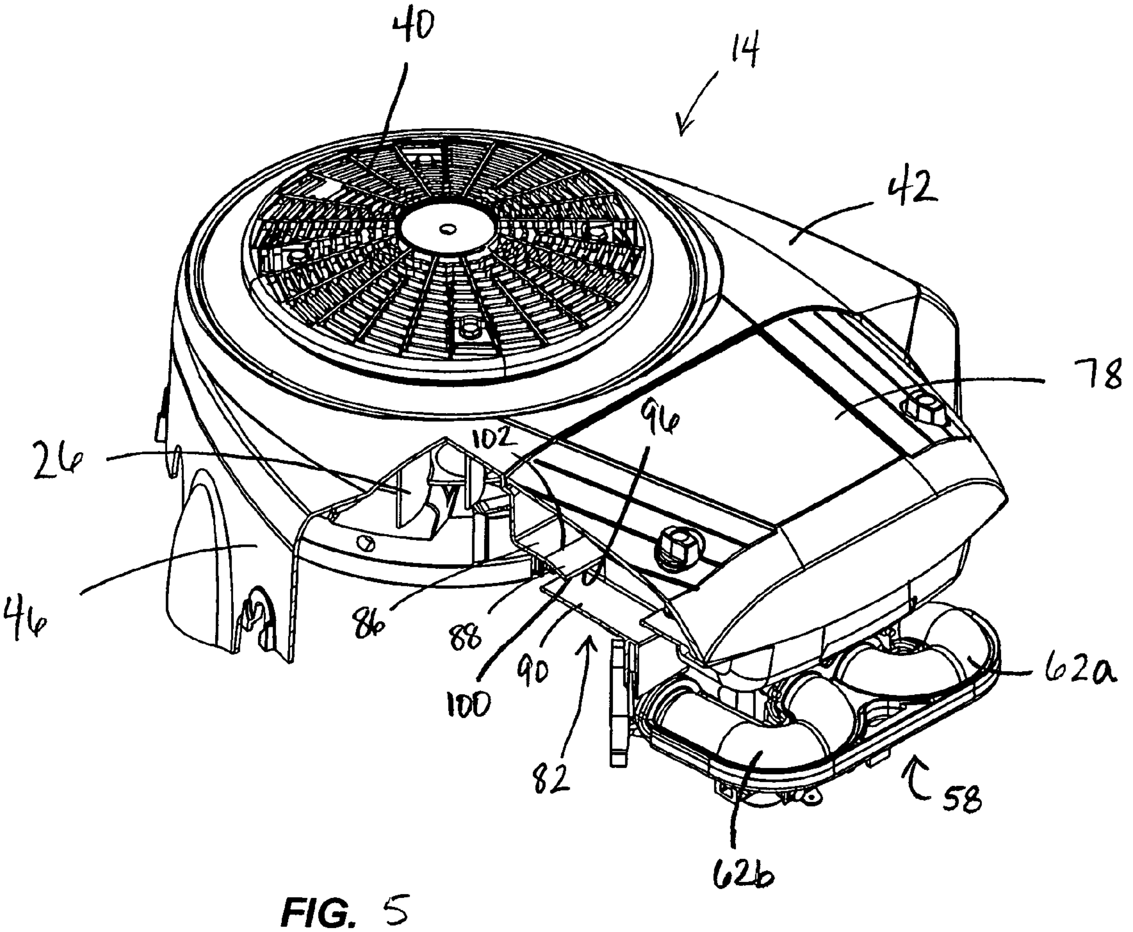
FIG. 5 is a partial section view taken along line 5-5 of FIG. 4.
Figure 6:
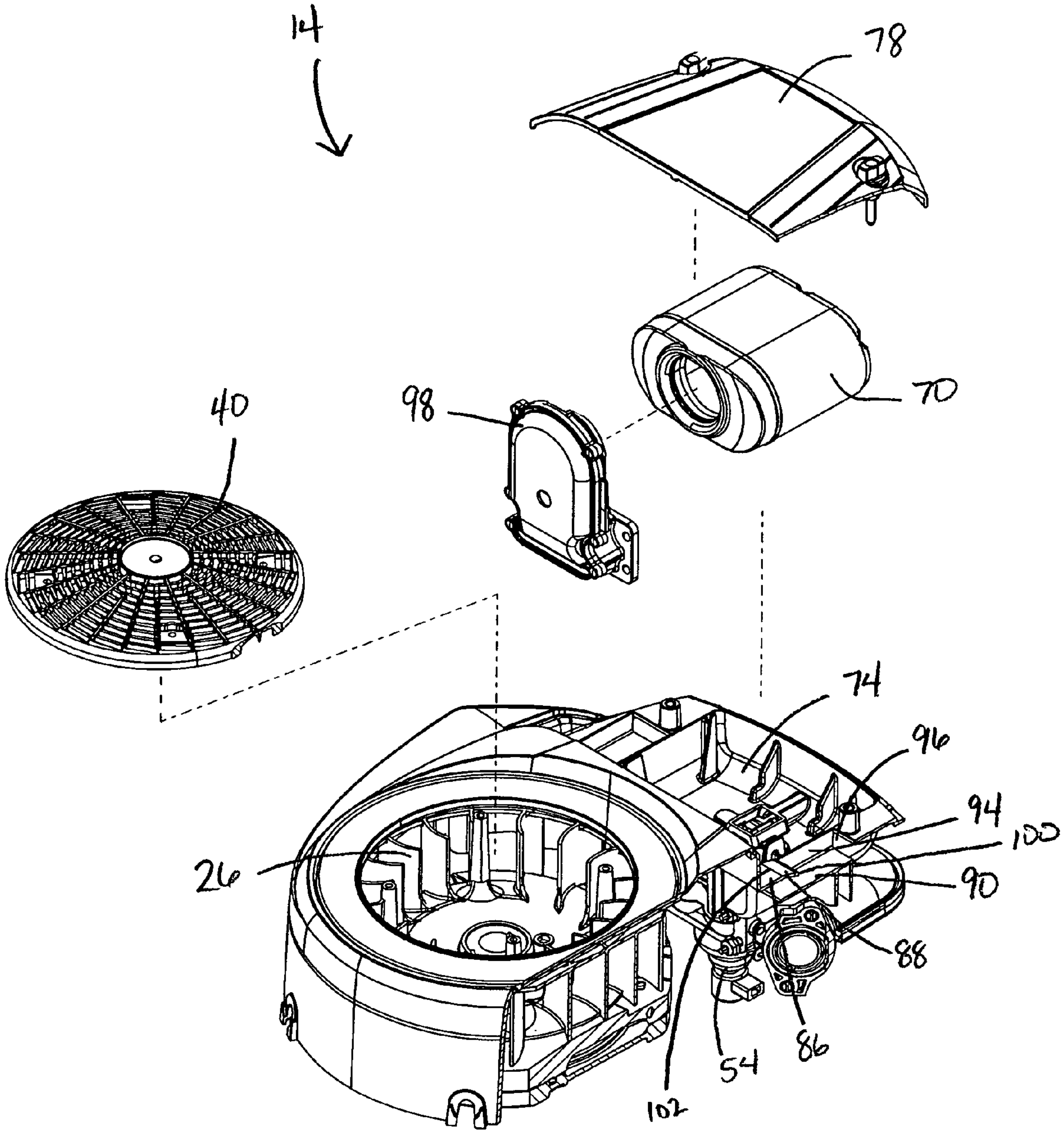
FIG. 6 is an exploded partial section view taken along line 6-6 of FIG. 4.

The engine 10 also includes an air/fuel mixing device that, in the illustrated embodiment, is a carburetor 54. The carburetor 54 is positioned between the engine cylinder assemblies 22*a*, 22*b* and supplies a mixture of fuel and air to the engine 10 by way of an intake manifold 58 as is known in the art. The fuel used by the engine 10 can be gasoline, diesel, or other types of fuel. The intake manifold 58, illustrated in FIG. 2, includes runners 62*a*, 62*b* that deliver the fuel/air mixture to the cylinder heads of the first and second cylinder assemblies 22*a*, 22*b*, respectively.

It should be appreciated that the engine 10 may be configured for use with other air/fuel mixing devices as well. For example a fuel injection system (not shown) including among other things a throttle body, a fuel rail, and one or more injectors can be provided to inject fuel into the throttle body, intake runners 62*a*, 62*b*, or directly into the engine combustion chamber. In other constructions, a gaseous fuel mixer (not shown) may be provided such that the engine can operate on fuels in gaseous form, such as natural gas.

Though the fan screen 40 functions to prevent some dirt and debris from entering the blower housing 14, air drawn into the blower housing 14 through the screen 40 by the fan 26 still contains dirt and debris. Thus, it is desirable for the engine 10 to include an air filter 70 to remove this dirt and debris from the combustion air moving through the blower housing 14. The first housing portion 34 also defines a filter compartment 74 into which the air filter 70 is placed. The blower housing 14 also includes a filter cover 78 that is coupled to the first housing portion 34 to enclose the filter compartment 74.

Air flow ducts 82 run along either side of the filter compartment 74. The air flow ducts 82 illustrated in FIGS. 3-8 are rectangular in cross section and direct a portion of the air drawn in by the fan 26 through the air filter 70, and a portion of the air into the environment outside the engine 10. It should be understood that while in the illustrated embodiment the blower housing 14 includes two air ducts, in other engine configurations, especially those utilizing only one cylinder, a single air duct may be used and still fall within the scope of the present invention. In other embodiments, more than two air ducts may be used. It should be further understood that while the air flow ducts of the illustrated embodiment are rectangular in cross section, other embodiments of the present invention may include air ducts of different cross sectional shapes, including, but not limited to, round, oval, square or trapezoidal.

The ducts 82 include an upper or first surface 86 having a ramped portion 88, a lower or second surface 90, and define an exhaust window 92. The ramped portion 88 is ramped downwardly or toward the lower or second surface 90 to deflect particles of dirt and debris in the air stream moving through the duct 82 toward the opposite second surface 90. The ducts 82 also include a sidewall 94 downstream from the upper surface 86 and adjacent the filter compartment 74. The upper or first surface 86 of the ducts 82 defines an opening 96 through which the air passes as it moves into the filter compartment 74. It should be understood that in other embodiments of the present invention, the ramped portion may be provided on another surface within the duct, such as on the sidewall or on the lower surface.

Figure 7:
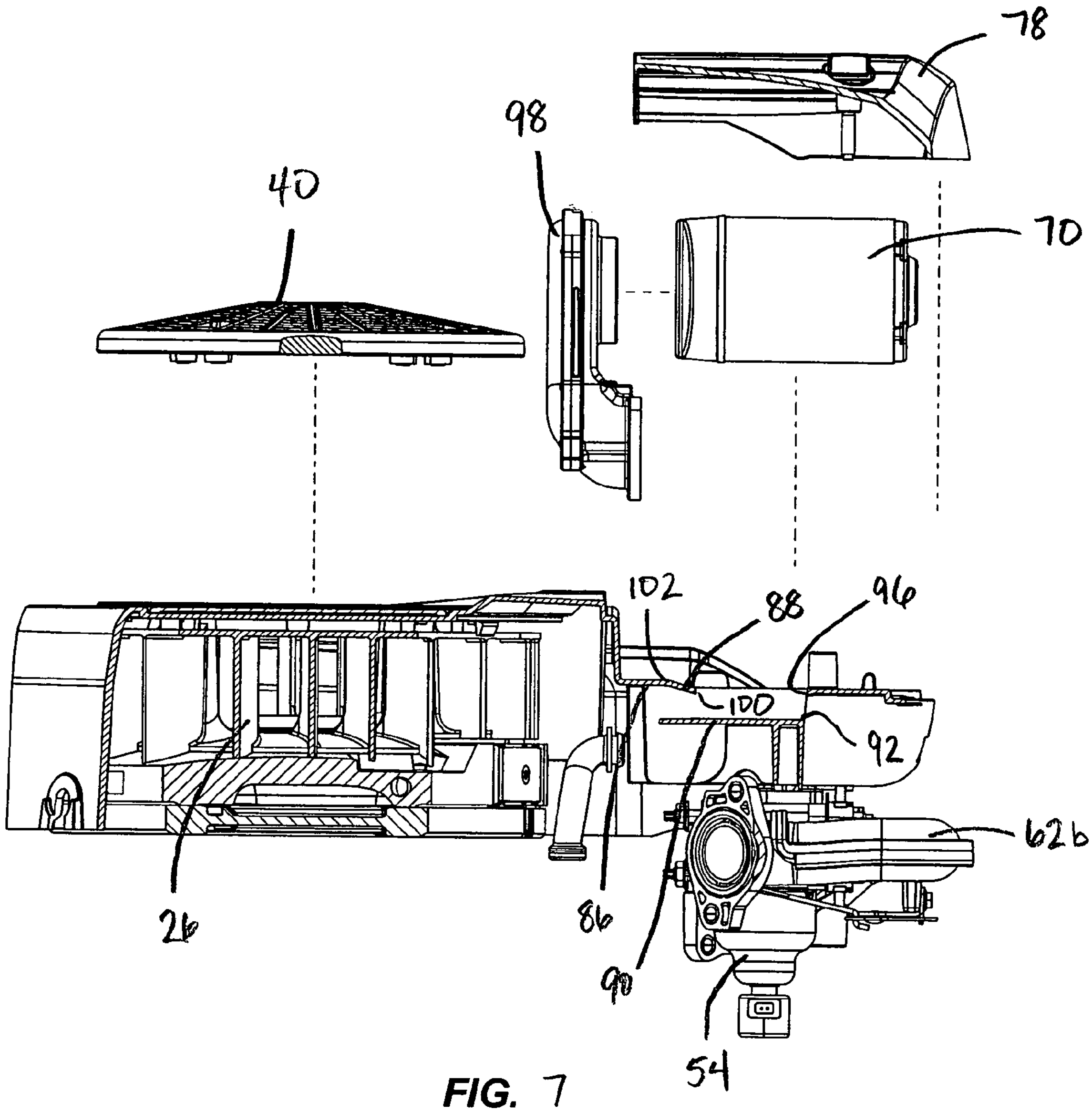
FIG. 7 is a side view of the blower housing illustrated in FIG. 6.
Figure 8:
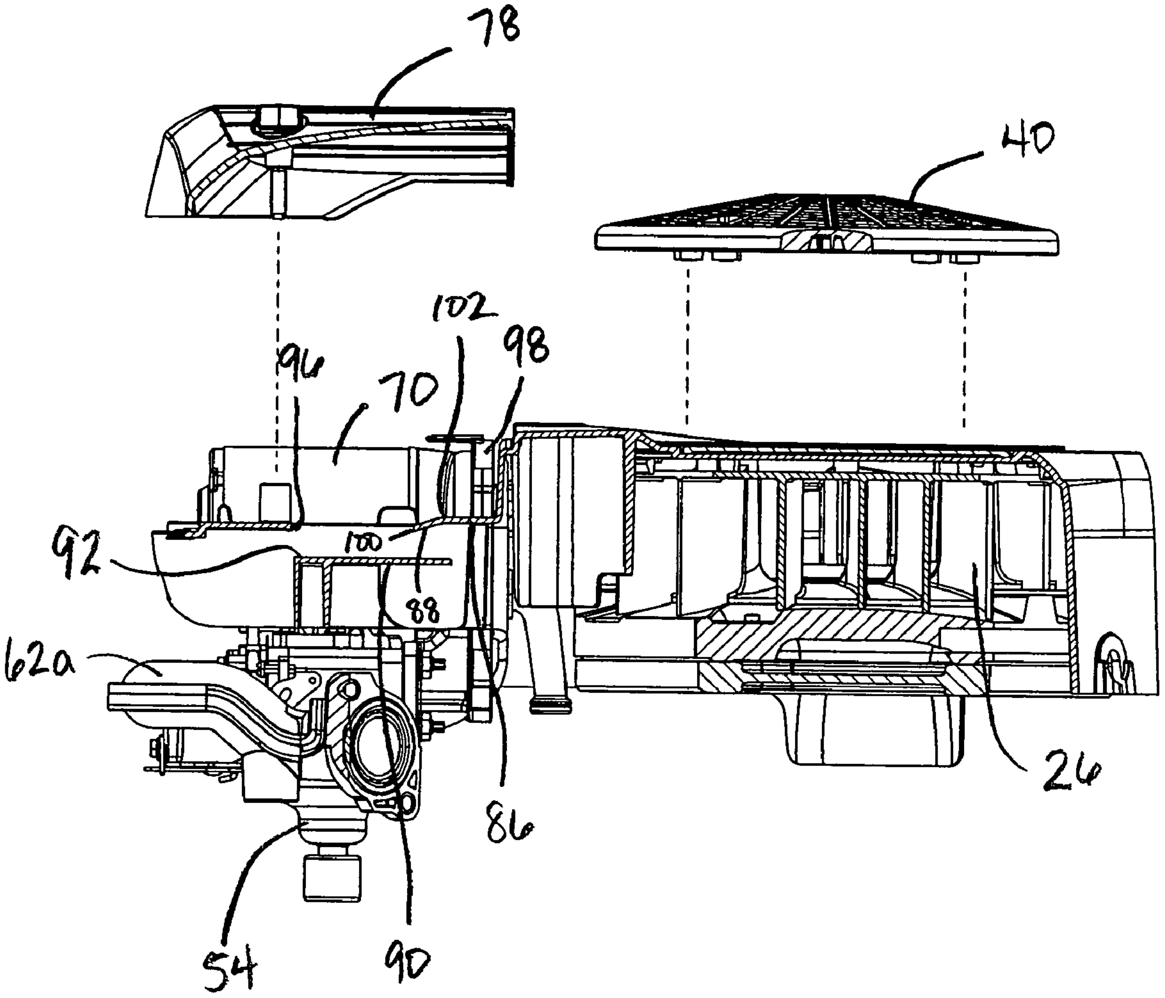
FIG. 8 is an exploded partial section view taken along line 8-8 of FIG. 4.

With reference to FIG. 7, the ramped portion 88 is angled toward the opposite second surface 90 at an angle of approximately fifteen degrees from the surface 86, and has a length that is approximately eleven percent of the length of the entire duct 82. The ramped portion 88 has a width approximately equal to the width of the duct 82. It should be understood that these dimensions are approximate, and that other dimensions are possible and still fall within the scope of the present invention.

When the fan 26 rotates, air is drawn through the intake opening 38 and into the first housing portion 34. The front wall 42 and the sidewalls 46 then guide some of the air toward the cylinder assemblies 22*a*, 22*b*. Depending upon the engine configuration, the front wall 42 and sidewalls 46 can be configured to guide different amounts of cooling air across the engine cylinder and cylinder head. For example, if the engine is an overhead valve or overhead cam engine, the sidewalls 46 can be configured to guide a larger percentage of the cooling air toward the outside of the cylinder head, whereas if the engine is an L-head engine, the sidewalls 46 can be configured to guide a larger percentage of the cooling air toward the outside of the engine cylinder. Various types of internal baffles and/or additional passageways can be provided to distribute the cooling air according to the cooling requirements of a specific engine.

Another portion of the air drawn into the blower housing 14 passes through the ducts 82. Some of this portion of the air will pass through the intake manifold 58 into the cylinders, and some will pass through the ducts 82 and into the environment outside the engine 10. Air running along the first surface 86 will strike the ramped portion 88. The ramped portion 88 will deflect larger pieces of the dirt and debris in the air stream to fall to the opposite second surface 90 of the ducts 82. The air running along the second surface 90, including the deflected dirt and debris (i.e., the "dirty" air), will pass through the ducts 82 and out the exhaust windows 92 into the atmosphere outside the engine 10.

The air running near the first surface 86 will be drawn through the opening 96 over the sidewall 94 and through the air filter 70, where most of the remaining particles of dirt and debris that were not deflected by the ramped portion 88 will be removed. The combustion air must make a sharp turn in the ducts 82 to travel over the sidewall 94 and through the opening 96 to the filter 70. The debris particles near the second surface 90 must overcome its momentum, as well as the force of gravity (in a vertical shaft engine configuration) and other forces from the air acting on the particles to be carried into the air filter compartment 74. By maximizing the area of the opening 96, the velocity of the air moving from the ducts 82 to the filter compartment 74 is kept as low as possible to reduce the amount of debris particles that can overcome the opposite forces acting on them to enter the filter compartment 74. This further reduces the amount of debris that travels to the filter 70.

The cleaned air then travels through an intake elbow 98, through the carburetor 54, and into the intake manifold 58. By deflecting larger particles of dirt and debris from the air stream that travels through the filter 70, the life of the filter may be extended as the filter is less likely to be clogged by large particles of debris. When the filter 70 needs to be cleaned and/or replaced, the filter cover 78 can be removed from the first housing portion 34 so that the user can remove the filter 70.

The size of the ducts 82 controls how much air flows out of the blower housing 14. The area of the ducts 82 from the fan 26 to the filter 74, and thus the size of the exhaust window 92, is optimized to ensure that there is more airflow available to the engine 10 than the engine will use for combustion, while at the same time avoiding unnecessary bleeding off of cooling air. As the ducts 82 are sized larger, the amount of air drawn into the blower housing 14 that is available for cooling the cylinder assemblies 22*a*, 22*b* is reduced. Reducing the amount of air available for cooling too much can lead to overheating problems in the engine. Thus, it is desirable to optimize the size of the ducts 82.

The volume of air drawn into the blower housing 14 by the fan 26 per revolution of the engine 10 is approximately constant. The amount of air drawn into the cylinder assemblies 22*a*, 22*b* for combustion per revolution of the engine 10 changes with volumetric efficiency, and is the greatest at the peak torque of the engine. Since the combustion air flow (i.e., air flowing through the filter 70 and into the intake manifold 58 through the carburetor 54) is greatest at peak torque, the net flow of air out the exhaust windows 92 is lowest at peak torque. At the peak torque, the cross-sectional area of the ducts 82 at the downstream end 100 of the ramped portion 88 must be large enough to maximize the amount of "dirty" air that will flow out of the exhaust windows 92 and that little if any air will flow backwards into the exhaust windows 92 and into the filter compartment 74. Air flowing back into the air ducts 82 could introduce more dirt and debris into the filter 70, which could clog the filter 70 and/or reduce the useful life of the filter 70. When there is adequate airflow available to the engine 10 for combustion (i.e., when the area of the ducts 82 is large enough), little if any air will flow backwards into the exhaust windows 92.

In the blower housing 14 of the illustrated embodiment, the ducts 82 have a cross-sectional area of about one square inch at the downstream end 100 of the ramped portion 88 so that a small amount of excess air flows out of the exhaust windows 92. This duct sizing optimizes the size of the ducts 82 so that there is some outward air flow while allowing for appropriate cooling of the engine 10. The cross-sectional area of the ducts 82 at the upstream end 102 of the ramped portion 88 is approximately twenty-eight percent larger than the cross-sectional area of at the downstream end 100. It is understood that while this area ratio is shown in the illustrated embodiment, other area ratios are possible and still fall within the scope of the present invention.

Various features of the invention are found in the following claims.

We claim:

1. A blower housing for use with an engine, the engine including at least one cylinder, and the blower housing adapted to receive air, the blower housing comprising:

- an intake opening through which air flows into the blower housing;
- an air filter housed within a filter compartment; and
- an air flow duct configured to direct intake air, the intake air entering the air flow duct in a first direction, the air flow duct having
  - a first surface including,
    - a first portion, and
    - a second portion extending obliquely from the first portion downstream of the first portion,
  - a second surface oriented substantially parallel and in facing relationship with the first portion of the first surface, the second portion of the first surface extending toward the second surface to deflect air passing through the air flow duct toward the second surface, separating the air into a first portion, and into a second portion having deflected particulate matter therein,
  - an aperture that allows air to flow from the air flow duct to the air filter in a second direction that is non-parallel to the first direction, the first portion of the air traveling through the aperture to the air filter, and
  - an exhaust window, located downstream of the second surface, configured such that the second portion of the air exits the blower housing through the exhaust window in a third direction that is parallel to the first direction.

2. The blower housing of claim 1, wherein the engine includes a fan, and wherein the intake opening is positioned to receive air from the fan.

3. The blower housing of claim 1, further comprising a removable filter cover adjacent the filter compartment.

4. The blower housing of claim 1, wherein the at least one cylinder includes two cylinders, and further comprising a second air flow duct that directs air to the air filter.

5. The blower housing of claim 1, wherein the engine includes an air/fuel mixing device, and wherein air passed though the air filter is channeled into the air/fuel mixing device.

6. The blower housing of claim 5, wherein the air/fuel mixing device is a carburetor, and wherein the air is channeled into the carburetor via an intake manifold.

7. The blower housing of claim 1, wherein the air duct is circular, an oval, square, trapezoidal or rectangular in cross section.

8. The blower housing of claim 1, wherein the air duct further comprises a sidewall.

9. The blower housing of claim 8, wherein the first surface and the sidewall define the aperture through which air passes to the air filter.

10. The blower housing of claim 9, wherein the sidewall is positioned normal to the first surface such that the first portion of the air turns from a direction substantially parallel to the first surface to pass over the sidewall and into the air filter.

11. The blower housing of claim 1, wherein the cross-sectional area of the exhaust window is sized to minimize backflow of air from the outside environment.

12. The blower housing of claim 1, wherein the air flow duct includes an upstream end and a downstream end, and wherein the cross-sectional area of the air flow duct is larger at the upstream end than at the downstream end.

13. The blower housing of claim 12, wherein the cross-sectional area of the upstream end is approximately twenty-eight percent greater than the cross-sectional area of the downstream end.

14. The blower housing of claim 12 wherein the cross-sectional area of the upstream end is between approximately 15 and 40 percent greater than the cross-sectional area of the downstream end.

15. The blower housing of claim 1, wherein the second portion extends obliquely from the first portion at an angle approximately equal to fifteen degrees.

16. The blower housing of claim 1, wherein the second portion extends obliquely from the first portion at an angle between approximately 10 and 30 degrees.

17. The blower housing of claim 1, wherein the second portion of the first surface is positioned vertically above the second surface such that particulate matter in the air strikes the second portion of the first surface falls downwardly toward the second surface.

18. An engine comprising:

a cylinder;

an air/fuel mixing device;

a fan rotatable about a fan axis to draw air into the engine, some of the air being utilized by the air/fuel mixing device; and a blower housing, the blower housing including an intake opening positioned to receive air from the fan, an air filter housed within a filter compartment, and an air flow duct adjacent to the filter compartment, the air flow duct configured to direct the movement of the air, the intake air entering the air flow duct in a first direction, the air flow duct having a first surface including a first portion, and a second portion extending obliquely from the first portion downstream of the first portion, a second surface oriented substantially parallel and in facing relationship with the first portion of the first surface, the second portion of the first surface extending toward the second surface to deflect air passing through the air flow duct toward the second surface, separating the air into a first portion, and into a second portion having deflected particulate mailer therein, an aperture that allows air to flow from the air flow duct to the air filter, the first portion of the air traveling through the aperture to the air filter in a second direction that is non-parallel to the first direction, and an exhaust window, located downstream of the second surface, configured such that the second portion of the air exits the blower housing through the exhaust window in a third direction that is parallel to the first direction.

19. The engine of claim 18, wherein the air flow duct has a first cross-sectional area near an upstream end of the second portion of the first surface and a second cross-sectional area near a downstream end of the second portion of the first surface, and wherein the first cross-sectional area is greater than the second cross-sectional area.

20. The engine of claim 19, wherein the first cross-sectional area is approximately twenty-eight percent greater than the second cross-sectional area.

21. The engine of claim 19, wherein the first cross-sectional area is between approximately fifteen and forty percent greater than the second cross-sectional area.

22. The engine of claim 18, wherein the second portion of the first surface is angled away from the first portion of the first surface approximately fifteen degrees.

23. The engine of claim 18, wherein the second portion of the first surface is angled away from the first portion of the first surface between approximately ten and thirty degrees.

24. The engine of claim 18, wherein the cross-sectional area of the exhaust window is sized to minimize backflow of air from the outside environment.

25. The engine of claim 18, further comprising a second air flow duct that directs air to the air filter.

26. The engine of claim 18, wherein the second portion of the first surface is positioned vertically above the second surface of the air flow duct such that particulate matter in the air that strikes the second portion falls downward toward the second surface, and wherein the second portion of the air is directed by the second surface of the air flow duct toward the exhaust window.

27. The blower housing of claim 1, wherein the aperture is at least partially defined by the second portion of the first surface.

28. The engine of claim 18, wherein the aperture is at least partially defined by the second portion of the first surface.

* * * * *